(12) United States Patent
Kravecs

(10) Patent No.: US 9,289,009 B2
(45) Date of Patent: Mar. 22, 2016

(54) METHOD FOR MANUFACTURE AND STORAGE OF FRUIT AND/OR BERRY PRODUCT

(76) Inventor: Eduards Kravecs, Riga (LV)

( * ) Notice: Subject to any disclaimer, the term of this patent is extended or adjusted under 35 U.S.C. 154(b) by 0 days.

(21) Appl. No.: 14/241,885

(22) PCT Filed: Aug. 17, 2012

(86) PCT No.: PCT/LV2012/000014
§ 371 (c)(1),
(2), (4) Date: Feb. 27, 2014

(87) PCT Pub. No.: WO2013/032314
PCT Pub. Date: Mar. 7, 2013

(65) Prior Publication Data
US 2014/0227423 A1    Aug. 14, 2014

(30) Foreign Application Priority Data
Aug. 31, 2011   (EP) .................................. 11179542

(51) Int. Cl.
| | | |
|---|---|---|
| *A23L 2/42* | (2006.01) | |
| *A23L 2/02* | (2006.01) | |
| *A23B 7/04* | (2006.01) | |
| *A23L 2/44* | (2006.01) | |
| *A23B 7/05* | (2006.01) | |
| *A23B 7/08* | (2006.01) | |
| *A23B 7/154* | (2006.01) | |

(52) U.S. Cl.
CPC ... *A23L 2/42* (2013.01); *A23B 7/04* (2013.01); *A23B 7/05* (2013.01); *A23B 7/08* (2013.01); *A23B 7/085* (2013.01); *A23B 7/154* (2013.01); *A23L 2/02* (2013.01); *A23L 2/44* (2013.01)

(58) Field of Classification Search
IPC ................... A23L 2/02,2/42; A23B 7/04, 7/08, A23B 7/085, 7/154
See application file for complete search history.

(56) References Cited

U.S. PATENT DOCUMENTS

| | | |
|---|---|---|
| 2,482,202 A | 9/1949 | Noyes |
| 2009/0169680 A1 | 7/2009 | Rabault |

FOREIGN PATENT DOCUMENTS

| | | |
|---|---|---|
| CN | 1168769 | 12/1997 |
| CN | 101803671 | 8/2010 |
| EP | 0485193 | 3/1996 |
| EP | 1662910 | 5/2009 |
| WO | WO2005/025338 | 3/2005 |

OTHER PUBLICATIONS

European Search Report in European patent application No. 11179542.3.
Notice of Intention to Grant in European patent application No. 11179542.3.

*Primary Examiner* — Chhaya Sayala
(74) *Attorney, Agent, or Firm* — TransPacific Law Group; Pavel I. Pogodin, Esq.

(57) ABSTRACT

The invention relates to the food-processing industry, particularly, to a method for manufacture and storage of honey-containing fruit and/or berry products. According to the invention, a fruit and/or berry juice and honey are mixed in the following proportions (weight percent): fruit and/or berry juice 75-93; honey 25-7, and the obtained product is stored at a temperature between −10° C. to −18° C. Upon unpacking, the product can be stored in a home refrigerator during 120 to 240 hours (dependent on the kind of the fruit and/or berry juice).

2 Claims, 3 Drawing Sheets

METHOD FOR MANUFACTURE AND STORAGE OF FRUIT AND/OR BERRY PRODUCT

The invention relates to the food-processing industry, particularly, to a method for manufacture and storage of honey-containing fruit and/or berry products.

There is known in the art a method for storage of frozen freshly squeezed fruit and/or berry juices at a temperature of between −20° C. and −30° C. The main disadvantage of this method is that, in the course of freezing, the juice cannot be kept in glass containers, because being frozen, the juice expands.

For the method of invention, the closest prior art is a method for manufacture and storage of fruit and/or berry products [EP1662910] including the steps of mixing a fruit and/or berry juice with honey in proportions of 55 to 75 percent by volume of juice and 25 to 45 percent by volume of honey; and storing the resulting product at a temperature below −10° C.

A fruit and/or berry product manufactured according to the above prior art method has a long storage life at a temperature below −10° C. However, after augmenting of the temperature of storage above −10° C., it is extremely undesirable to chill it again to a temperature below −10° C. Usually, a product which was stored at a temperature −10° C., bought in a shop warms up to a temperature above −10° C. before it reaches the shelf of a home freezer. Although during the storage the product is semisolid, it is difficult to consume it without raising its temperature, as teeth are sensitive to low temperatures and it is unpleasant to touch a too cold container. At a temperature of +2° C. to +6° C., as usually kept in a home refrigerator, such a fruit and/or berry product cannot be stored for a sufficiently long time, as in manufacturing, the product has not been additionally processed to reduce the level of bacteriological environment, no acids have been added artificially and the original pH level has been increasing, during storage at low temperature, mainly due to polymerization and/or isomerization of organic acids. Consequently, at an increased temperature, the pH value is not sufficiently low to prevent the growth of bacteriological environment.

The technical problem to be solved by the present invention is to increase the storage life of the defrosted fruit and/or berry product especially when stored at a temperature of +2° C. to +6° C., as usually kept in a home refrigerator.

In the method according to the present invention, where a fruit and/or berry juice is mixed with honey and the resulting mixture is stored at a temperature below −10° C., the components are provided in the following proportions (weight percent):
juice—75 to 93;
honey—7 to 25,
and the resulting product is stored at a temperature between −10° C. and −18° C.

Preferably, the juice and honey are provided in the following proportions (weight percent):
juice—83 to 93;
honey—7 to 17.

If the content of honey is less than 7%, the product cannot be stored at a temperature of between −10° C. and −18° C. in a glass container, because the product freezes at such temperature and a glass container breaks, because of the thermal expansion of the product. As established experimentally, a fruit and/or berry product obtained by mixing a fruit and/or berry juice with honey, the content of honey being between 7 and 25 weight percent, preferably between 7 and 17 weight percent, has a storage life, when defrosted (i.e. at a temperature higher than −10° C.), longer than that of the closest prior art product, especially when stored at a temperature of +2° C. to +6° C., as usually kept in a home refrigerator. In the drawings there is graphically shown how the storage life of the defrosted fruit and/or berry product manufactured according to the method of invention depends on its composition (honey content). As shown in the drawings, the storage life of the defrosted product is the longest where the honey content is between 7 and 17 weight percent. At honey contents above 17 weight percent, the storage life gradually shortens. At honey contents above 25 weight percent, the storage life of the defrosted product manufactured according to the method of invention is substantially the same as that of the above-mentioned closest prior art product.

As the product of invention contains more juice than the above-mentioned closest prior art product, it has a lower original value of pH. As established experimentally the value of pH of the product of invention also rises slower during the storage of the product at a low temperature compared to the above-mentioned closest prior art product. As a result, pH level of the defrosted product of invention is sufficiently low to restrain growth of the bacteriological environment after unpacking the product.

The storage temperature of the frozen product is chosen in a range between −10° C. and −18° C. As established experimentally, the storage life at a storage temperature below −10° C. is significantly shorter. On the other hand, at a storage temperature above −18° C., pH value significantly rises due to isomerization and/or polymerization of organic acids, which results in reducing the storage life of the defrosted product. In Table 1 below there is shown how the storage life of defrosted product depends on the honey content and storage temperature.

A fruit and/or berry product manufactured and stored according to the method of invention has a long storage life not only when stored at a temperature below −10° C., but also at higher temperatures, particularly, at a temperature of between +2° C. and +6° C., as usually kept in a home refrigerator. Upon unpacking, the product can be stored in a home refrigerator for a period of 120 to 240 hours (dependent on the type of the fruit and/or berry juice).

On the drawings there are shown dependence diagrams of the storage life of the product of invention as a function of the honey content (the product was stored in a freezer at a temperature −10° C. during up to one year. Being defrosted, the fruit and/or berry product was stored at a temperature +4° C.

Figure 1:
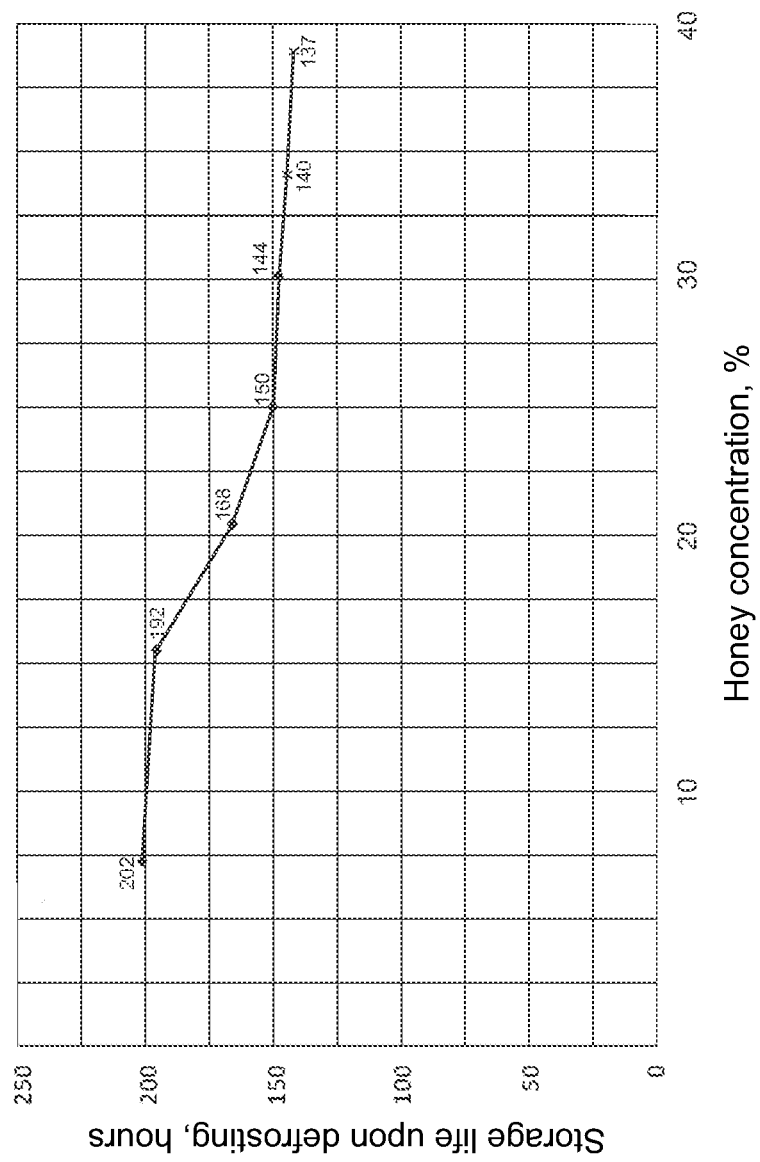
FIG. 1 shows a dependence diagram of storage life as a function of honey content for a fruit and/or berry product obtained according to the method of invention containing sea-buckthorn juice.
Figure 2:
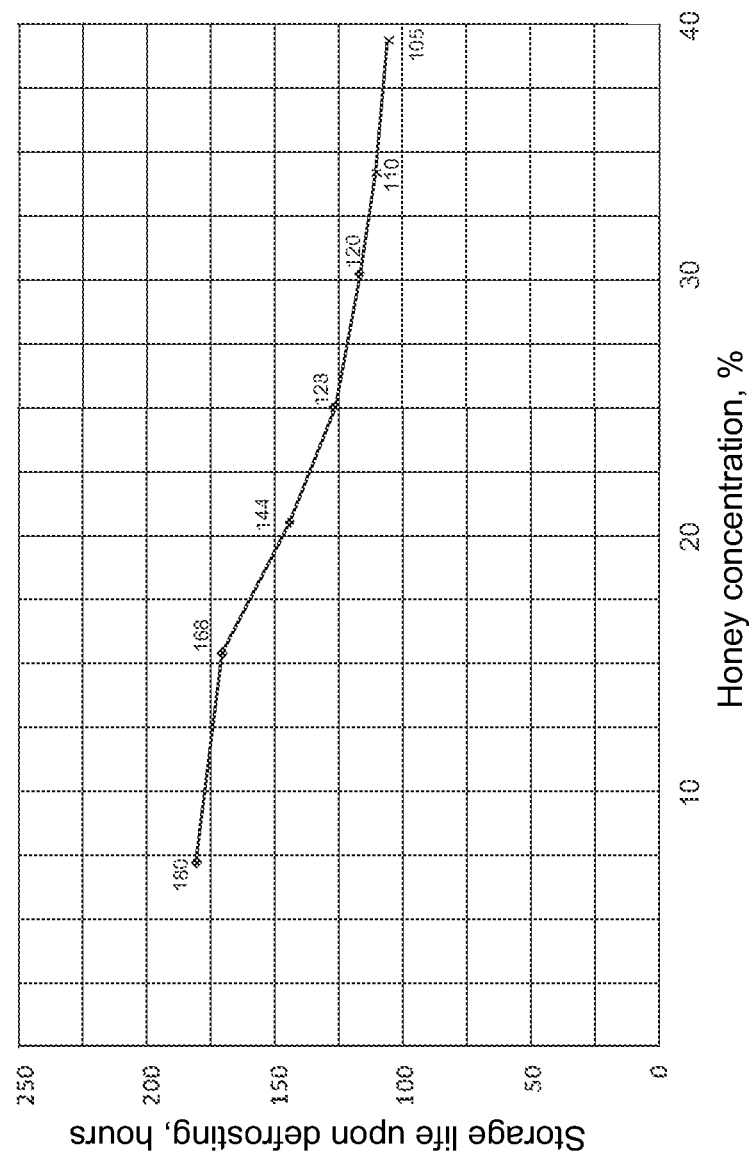
FIG. 2 shows a dependence diagram of storage life as a function of honey content for a fruit and/or berry product obtained according to the method of invention containing cowberry juice with pulp.
Figure 3:
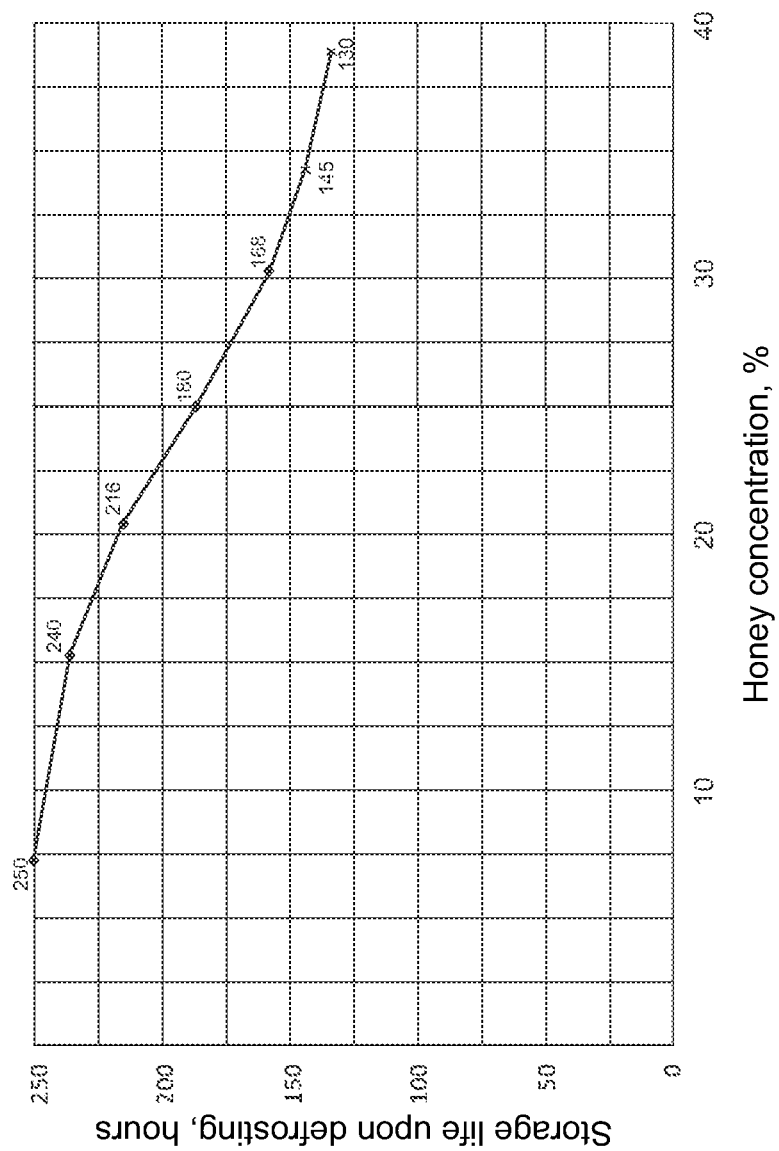
FIG. 3 shows a dependence diagram of storage life as a function of honey content for a fruit and/or berry product obtained according to the method of invention containing cranberry juice with pulp.

Further there are described non-limiting Examples of embodiment of the method for manufacture and storage of fruit and/or berry products according to the present invention.

EXAMPLE 1

To manufacture a fruit and/or berry product according to the method of invention, a freshly squeezed sea-buckthorn juice with pH 2.8 and a spring rapeseed honey with pH 4.4 were used.

83 kg of the juice and 17 kg of the honey (the proportion of the ingredients in weight percent is 83:17) were mixed. The obtained product was stored in a freezer at a temperature of −18° C. during up to one year. Then the product was unpacked, a part of the product was consumed, and the rest of the product was stored in a home refrigerator at a temperature +4° C. The storage life of the defrosted product was 168 hours.

The Examples generalized in Table 1, where there is shown how the storage life of defrosted product depends on the honey content and storage temperature, were embodied in the same way as Example 1.

As follows from the data of Table 1, the storage life of defrosted product is longer where the honey content is below 25 weight percent and the storing temperature of the product before defrosting was not lower than −18° C.

TABLE 1

The storage life of defrosted fruit and/or berry product as a function of the honey content and storage temperature after defrosting.

| | | Product characteristics upon defrosting, in case the product had been stored for two months at a temperature of: | | | | | | | |
|---|---|---|---|---|---|---|---|---|---|
| | | −10° C. | | −14° C. | | −18° C. | | −21° C. | |
| Product contents | pH | pH | Storage life upon defrosting, hrs | pH | Storage life upon defrosting, hrs | pH | Storage life upon defrosting, hrs | pH | Storage life upon defrosting, hrs |
| Sea-buckthorn juice (pH = 2.80) + 17% honey (pH = 4.4) | 3.15 | 3.30 | 192 | 3.35 | 168 | 3.37 | 168 | 4.15 | 72 |
| Sea-buckthorn juice (pH 2.80) + 31% honey (pH = 4.4) | 3.40 | 3.65 | 144 | 3.70 | 120 | 3.75 | 120 | 4.55 | 36 |
| Cowberry juice with pulp (pH 3.00) + 17% honey (pH = 4.4) | 3.35 | 3.50 | 168 | 3.55 | 120 | 3.60 | 120 | 4.40 | 48 |
| Cowberry juice with pulp (pH 3.00) + 31% honey (pH = 4.4) | 3.50 | 3.80 | 120 | 3.90 | 72 | 3.95 | 72 | 4.85 | 36 |
| Cranberry juice with pulp (pH 2.70) + 17% honey (pH = 4.4) | 3.10 | 3.20 | 240 | 3.25 | 216 | 3.30 | 216 | 4.05 | 120 |
| Cranberry juice with pulp (pH 2.70) + 31% honey (pH = 4.4) | 3.30 | 3.50 | 168 | 3.65 | 14 | 3.75 | 144 | 4.45 | 60 |

The invention claimed is:

1. A method for manufacture and storage of a berry product comprising the steps of mixing a berry juice with honey and storing the obtained product, wherein the berry juice and honey to be mixed are provided in the following proportions (weight percent):

berry juice 75-93;
honey 25-7, and the obtained berry product is stored at a temperature between −10° C. and −18° C.

2. The method according to claim 1, wherein the berry juice and honey to be mixed are provided in the following proportions (weight percent):

berry juice 83-93;
honey 17-7.

* * * * *